April 30, 1968 — I. L. NELSON — 3,380,229
APPARATUS FOR HEAT SEALING THERMOPLASTIC SURFACES
Filed May 12, 1965
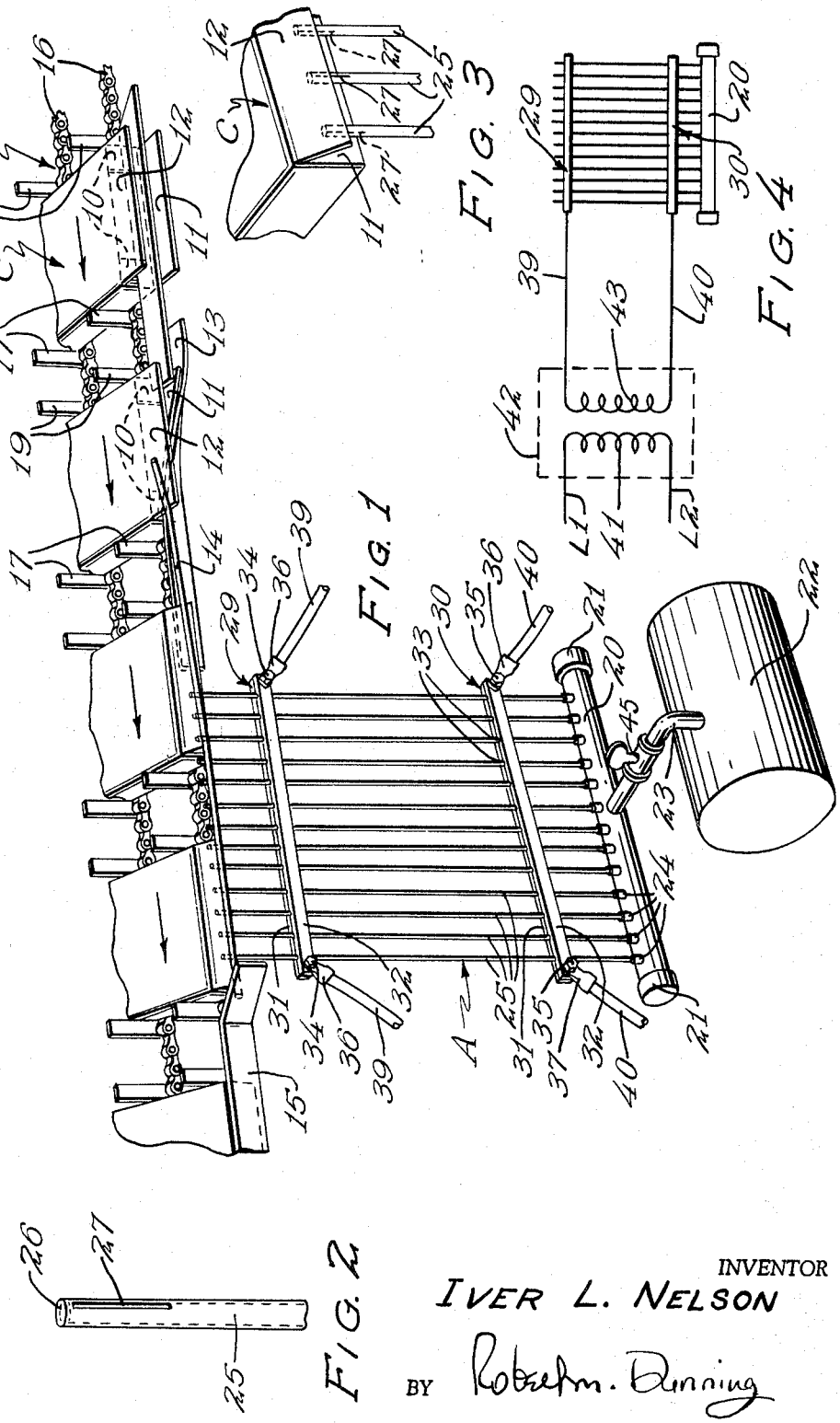
INVENTOR
IVER L. NELSON
BY Robert M. Dunning
ATTORNEY

United States Patent Office 3,380,229
Patented Apr. 30, 1968

3,380,229
APPARATUS FOR HEAT SEALING
THERMOPLASTIC SURFACES
Iver L. Nelson, Minneapolis, Minn., assignor to Waldorf
Paper Products Company, St. Paul, Minn., a corporation of Minnesota
Filed May 12, 1965, Ser. No. 455,200
12 Claims. (Cl. 53—375)

ABSTRACT OF THE DISCLOSURE

This invention describes an apparatus for sealing a pair of surfaces in face contact at least one of the surfaces bearing thermoplastic material. A plurality of metal tubes are connected to an air manifold, and are heated to a temperature in excess of the temperature necessary to render the thermoplastic material tacky. Air blown through the tubes and between the surfaces or against said one surface renders the thermoplastic tacky so that the surfaces may be sealed. The tubes are preferably heated by securing longitudinally spaced electrodes to the tubes and applying a current to the electrodes.

---

This invention relates to an improvement in method said apparatus for heat sealing thermoplastic surfaces together and deals particularly with a means of heating the areas to be heat sealed without actually contacting the surfaces.

During recent years, the production of cartons having thermoplastically-coated surfaces has greatly increased. One of the difficulties experienced with cartons of this type lies in sealing areas of the cartons in face contact. Adhesives are available which can be used for this purpose, but such adhesives usually comprise hot melt compositions and the like, the heat of the composition tending to melt the thermoplastic coating and to combine therewith to form an effective seal. In some instances, the cartons and similar structures are heat sealed by the application of heat to the coated surfaces. This normally requires that heat and pressure be applied to the opposite sides of the surfaces being sealed. When this is done, the heat usually destroys the glossy surface of the paperboard. If the coated surface comes into contact with heated plates or heated metal bands, the coating tends to melt and adhere to the plates or bands necessitating frequent stops to remove the coating collected on the heating elements. Thus sealing means of this type are usually not practical.

I have made attempts to seal the surfaces together by directing a blast of heated air against one or both of the surfaces which are to come in contact. Considerable expense is usually involved in heating the air to the temperature required, and it has been found difficult to control the air so that it will heat the surfaces to be sealed without melting the coating on others of the surfaces. I have found, however, that a seal can be easily and effectively produced by arranging a series of small diameter tubes preferably positioned between the surfaces which are to be sealed just before these surfaces are brought into contact. The ends of the tubes are apertured in a manner to direct the air toward one or both of the surfaces to be sealed. The tubes are heated to a high degree of temperature, and the air is quickly heated during the flow through the tubes due to the small diameter of the passages.

A features of the present invention resides in the provision of a simple and effective means of heating the tubes. The tubes are connected at one end to an air manifold connected to a source of air supply. The small diameter tubes are held in parallel spaced relation by clamping bar elements which are spaced longitudinally of the tubes. Current is supplied to the clamping bars in such a manner that the portions of the tubes between the clamping bar elements form resistance units. In actual practice, when current is supplied to the clamping bars, small diameter stainless steel tubes may be heated to a cherry red color. Nichrome metal tubes function even more effectively. As a result, the air blown through the tubes is heated to a temperature well above the melting point of the coating in its travel through the small passages. By this means, air is directed against one or more of the surfaces being sealed, softening the coating sufficiently to permit an effective seal to be produced when the heated surfaces are brought together.

A further feature of the present invention resides in the fact that by varying the number of tubes which are employed and the spacing of the tubes, the sealing unit may be easily adapted to the speed of operation of the unit. For example, if the cartons or similar objects to be sealed are traveling past the heating tubes at the rate of 60 per minute, perhaps a dozen small diameter tubes may be used to supply the necessary heated air. If the cartons are designed to travel at a higher rate of speed past the heating element, a greater number of tubes or a greater spacing of the tubes may be necessary.

A further feature of the present invention resides in the fact that the length of the heated portion of the tubes may be also varied to vary the temperature of the flowing therethrough. By increasing the distance between the electrodes, a greater length of the tubes will be heated, thereby increasing the temperature of the air passing through the tubes, the speed of flow remaining constant. Obviously, the temperature of the air leaving the tubes is also variable with variation in the speed of flow of the air.

These and other objects and novel features of the present invention will be more clearly and fully set forth in the following specification and claims.

In the drawings forming a part of the specification:

FIGURE 1 is a diagrammatic view of a carton closing apparatus showing the heating elements used in conjunction therewith.

FIGURE 2 is an enlarged view of the end of one of the tubes showing the manner in which the air is directed toward one of the surfaces to be sealed.

FIGURE 3 is a perspective view of the relationship between the ends of the tubes and the surfaces to be sealed.

FIGURE 4 is a diagrammatic view of the wiring of the heating element.

The heating unit A is shown in combination with a conventional type of carton closing apparatus which is indicated in general by the letter B. The carton closing apparatus B is indicated as closing the flaps on one end of a series of rectangular cartons C. The cartons C are of a conventional type having rectangularly arranged side and end walls. Closure flaps 10 are hinged to the end walls of the carton which are vertical as the cartons are transported by the machine. Flaps 11 are hinged to one side wall of each carton which is shown as the bottom panel of the cartons in their travel through the apparatus. Closure flaps 12 are hinged to the other side wall panels which comprise the top panels of the cartons as they pass through the apparatus. In the drawings, the end wall flaps 10 have been folded inwardly to a common plane. As the cartons move to the left, as viewed in the drawings, the bottom closure flaps 11 are engaged by a folding horn 13 and are folded outwardlly of the end wall flaps 10. As the cartons continue to move to the left, the top closure flaps 12 are engaged by a folding horn 14 and are folded down at an angle during the time the cartons are passing the heating unit A. After moving past the heating unit, the flaps 12 are engaged by a guide plow 15 and are folded into face contact with the outer surfaces of the flaps 11. The purpose of the apparatus is to seal the inner surfaces of the flaps 12 to the outer surfaces of the flaps 11. One or both of the surfaces being sealed bear a coating of thermoplastic material which provides a seal when the coating is heated to the necessary degree.

The apparatus B is merely diagrammatically and partially illustrated, as carton closing apparatus of the type illustrated is well-known in the art. The apparatus is shown as including a pair of conveyor chains 16 which carry lugs 17 and 19 which are arranged in pairs on the chains. The lugs 17 are designed to engage the forward walls of the cartons to hold these walls vertical and the lugs 19 are designed to engage the rear walls of the carton. In normal practice, cartons are fed into the pockets formed by the chains and the pairs of lugs and remain thus engaged during the sealing operation and usually leave the conveyor as the conveyor chains pass about sprockets at the outlet end of the machine.

In the illustration, only one heating element is shown. Normally, cartons of the type in question are simultaneously closed at both ends and in such a case, there would be a similar heating element on the opposite side of the conveyor chains. As the heating element may be used in a wide variety of sealing machines, the apparatus illustrated is only one example of the type of apparatus which may be used to bring the two surfaces to be sealed into contact.

The heating unit A is provided with an air manifold 20 having a closed end 21 and which is connected intermediate its ends to a source of compressed air. This is normally supplied by a fan or compressor and is diagrammatically illustrated in the drawings as comprising an air supply tank 22 connected by a pipe or conduit 23 to the center of the manifold 20. The pressure of the air is just sufficient to provide the desired speed of flow of the air through the outlet tubes which will be described.

The manifold 20 is provided with a series of aligned parallel fittings 24 communicating with the interior of the manifold and from which the hollow tubes 25 extend. The tubes 25 comprise small diameter tubes which may be of stainless steel but which preferably would be of resistance material such as that used in the formation of electrical resistance heating units such as Nichrome. The tubes 25 are of equal length and are arranged in parallel relation. As indicated in FIGURE 2 of the drawings, the ends 26 of the tubes 25 which are most remote from the manifold 20 are usually closed. Each tube is provided adjacent its upper end with a longitudinally extending slot forming an elongated air outlet opening 27. As indicated in FIGURE 1 of the drawings, the tubes 25 are held in parallel spaced relation by an upper electrode 29 and a lower electrode 30. The two electrodes are similarly constructed, each electrode including a pair of clamping bars 31 and 32, both of which are semicircularly notched as indicated at 33 to fit snugly about the tubes 25. The clamping bars are held in position by clamping bolts, the clamping bolts of the upper electrode 29 being indicated at 34 and the clamping bolts of the lower electrode 30 being indicated at 35. The bolts 34 and 35 also extend through terminals 36 and 37 on the ends of conductors 39 and 40, respectively.

With reference now to FIGURE 4 of the drawings, it will be noted that the line wires L-1 and L-2 are connected to the primary coil 41 of a transformer 42 which transforms the 220-volt current to a low voltage high amperage current. The secondary coil 43 of the transformer 42 is connected to the conductors 39 and 40 which are connected to the electrodes 29 and 30. When current is flowing through the circuit, the portions of the tubes 25 which are between the electrodes 29 and 30 are quickly heated to an extremely high temperature. In actual practice, the portions of the stainless steel or Nichrome tubes 25 which are between the electrodes are heated to a cherry red. As a result, the air which flows through the tubes 25 is heated to a temperature above the melting temperature of the coating or surface to be sealed.

As indicated in FIGURE 3 of the drawings, the slots 27 of alternate tubes may be directed outwardly from the conveyor to direct the heated air against the inner surface of each closing flap 12 while the remaining slot 27 may be directed inwardly toward the bodies of the cartons C in order to heat the outer surface of the closure flaps 11. In some instances, all of the slots have been directed inwardly toward the cartons where it has been found unessential to apply heat to the inner surfaces of the outer flaps. The number of tubes 25 may be varied, and the spacing between the tubes may also be varied to suit the speed of operation of the apparatus. The degree of heat imparted to the air can be varied by changing the speed of travel through the tubes, and also by changing the position of the electrodes 29 and 30. As the electrodes are moved closer together, the effective length of the tube which is heated will vary. Obviously, the entire length of the tubes will become heated. However, the intense heat is in the portions of the tubes between the electrodes.

The air supply from the air line 23 is controlled, as by valve 45, by means of which the flow of air may be stopped. When the movement of cartons along the conveyor is stopped, the supply of air may also be stopped to prevent overheating of cartons passing the heating unit A. At the same time, the temperature of the heating unit may be maintained so that heat is instantly available for the carton surfaces as soon as the valve 45 is turned on.

In accordance with the patent statutes, I have described the principles of construction and operation of my improvement in method and apparatus for heat sealing; while I have endeavored to set forth the best embodiment thereof, I desire to have it understood that obvious changes may be made within the scope of the following claims without departing from the spirit of my invention.

I claim:

1. A heat sealing apparatus for sealing a pair of surfaces in face contact, the apparatus including:
    a plurality of metal tubes arranged in parallel relation,
    an air manifold communicating with an end of each said tube to flow air through said tubes,
    a source of air connected to said manifold,
    a pair of electrodes connected to longitudinally spaced areas of said tubes,
    a source of current connected to said electrodes to heat the portions of said tubes between said electrodes,
    means moving at least one of said surfaces in the path of air flowing through said tubes to heat said surfaces, and
    means for bringing said surfaces into face contact after said surface has been heated.

2. The structure of claim 1 and in which both said surfaces are moved by said moving means in the path of air flowing through said tubes.

3. A heat sealing apparatus for sealing a pair of surfaces in face contact, the apparatus including:
    an air manifold connected to a source of supply of air under pressure,
    a series of parallel metal tubes connected to said air manifold in side-by-side relation and being of generally uniform length, the end portions of said tubes most remote from said manifold having air outlet openings therein,
    a pair of electrodes connected to said tubes at longitudinally spaced areas thereof,
    a source of current connected to said electrodes to heat the portions of said tubes between said electrodes,
    means conveying at least one of said surfaces past said tubes in the path or air flowing through said outlet openings to heat said surface, and
    means bringing said surfaces into face contact.

4. The structure of claim 3 in which the ends of said end portions are closed and in which said outlet openings are longitudinally extending slots.

5. The structure of claim 4 and in which the slots in alternate tubes are directed in opposite sides of the tubes from the other slots.

6. A heat sealing apparatus for heat sealing a pair of surfaces in face contact at least one of said surfaces being a thermoplastic material, the apparatus including:
   an air manifold connected to a source of air under pressure,
   a series of air conducting tubes communicating with the interior of said manifold and extending in spaced substantially parallel relation,
   said tubes having air discharge apertures adjacent the ends thereof most remote from said manifold, said tubes being of substantially equal length,
   means for heating said tube to a temperature in excess of the temperature necessary to render said thermoplastic material tacky,
   means for conveying at least one of said surfaces in the path of air flowing through said discharge apertures, and
   means for bringing said surfaces into face contact while said material is in a tacky condition.

7. A carton closing apparatus for use in conjunction with a carton having a pair of closure flaps hinged along parallel lines of fold and foldable into face contact at least one of said flaps having a surface of thermoplastic material, the apparatus including:
   a conveyor for conveying said carton in a direction parallel to said lines of fold,
   means engageable with one of said flaps to fold it into right angular relation to the panel to which it is hinged,
   an air manifold,
   a series of air tubes connected to said air manifold and extending in parallel relation to terminate in closely spaced relation to said folded flap, said tubes being spaced in a direction parallel to the direction of travel of said conveyor,
   the end portions of said tubes most remote from said manifold having discharge apertures therein,
   means for heating said tubes to a temperature in excess of that necessary to render said thermoplastic surface tacky, the discharge apertures directing air to the thermoplastic material as said carton is conveyed past said tubes, and
   means for bringing the other of said flaps into contact with said surface.

8. The structure of claim 7 and in which the tubes are arranged in a plane substantially parallel to said folded flap, and in which said discharge apertures comprise parallel slots in the sides of the tubes nearest said surface, said surface being on said folded flap.

9. The structure of claim 7 and including means for folding said other flaps toward said one flap so that said flaps extend on opposite sides of the extremities of said tubes.

10. The structure of claim 7 and in which said heating means comprises a pair of electrodes connected to longitudinally spaced areas of said tubes, said tubes being made of metal, and including a source of electrical current connected to said electrodes to heat the portions of said tubes between said electrodes.

11. The structure of claim 1 and in which each said electrode comprises a pair of conductive clamping bars arranged on opposite sides of said tubes, and
   means for clamping said bars against said tubes.

12. The structure of claim 11 and in which said clamping bars are notched to accommodate said tubes.

References Cited
UNITED STATES PATENTS

| | | | |
|---|---|---|---|
| 2,109,900 | 3/1938 | Cohen | 219—300 |
| 2,287,974 | 6/1942 | Cohen | 219—300 X |

TRAVIS S. McGEHEE, *Primary Examiner.*